UNITED STATES PATENT OFFICE.

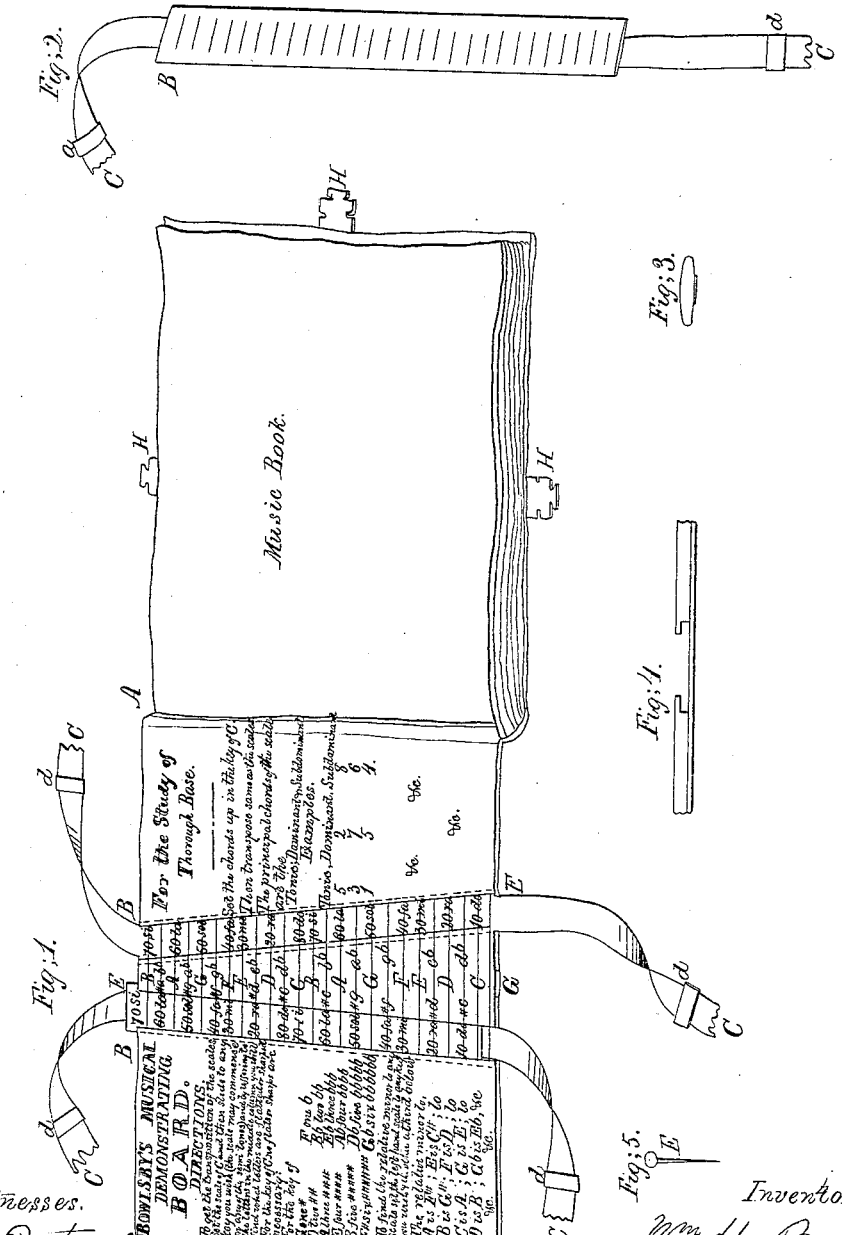

WILLIAM H. BOWLSBY AND GEORGE W. BOWLSBY, OF MONROE, MICHIGAN.

MUSICAL DEMONSTRATING BOARD.

Specification forming part of Letters Patent No. 43,473, dated July 12, 1864.

*To all whom it may concern:*

Be it known that we, WILLIAM H. BOWLSBY and GEORGE W. BOWLSBY, of Monroe, in the county of Monroe and State of Michigan, have invented a new and Improved Mode of Demonstrating Musical Scales and Chords; and we do hereby declare that the following is a full and exact description thereof, reference being had to the accompanying drawings, and to the letters of reference marked thereon.

The nature of our invention consists in a board or other surface, properly prepared, on which are represented movable scales and notes, and which are capable of representing and demonstrating all the transpositions and forms of the scales and chords used in music. It may be made in the form of an ordinary "blackboard," or be fitted into the cover of a book or in any other suitable manner. The different parts are, the column of positive pitch, the sliding scales with their ways, the movable note-pins, and the written directions, all placed upon or sunk into the surface of the board or book-cover or other apparatus.

In the accompanying drawings, Figure 1 is a front or plan view of the board attached to a book-cover; Fig. 2, a front view of one of the slides; Fig. 3, a cross-section of one of the slide-tubes; Fig. 4, a cross-section of one of the slideways; Fig. 5, a view of one of the note pins.

Similar letters of reference refer to like parts.

A is the book with the device upon the inside of the cover.

B B are two slides, of paper, wood, metal, bone, or any proper material, on which are written the lines of the staff with the numerals and syllables fixed in their proper places, and between the figures and words are set the note-pins E. When the slides are made of paper, they should be formed into a tube, as shown in cross-section in Fig. 3, to hold the note-pins in place. The tube has a piece of ribbon or tape, C, at each end, to facilitate the movement of the slides, and the tapes have hooks *d d*, to hold them into the book when closed.

G is the column of positive pitch, and from it is read the relative pitch on the sliding-scale bars or tubes.

The movable note-pins E may be made of wire bent into various forms to suit the apparatus used, and are inserted through the front of the tube, the heads resting upon the staff-lines, and the stems between the inner and outer walls.

H H H are clasps to fasten the book shut and assist in keeping the note pins in place when not in use.

The center or fixed column, G, contains the enharmonic scale, and, being stationary, represents absolute pitch.

The note-pins E are made movable for the purpose of setting up the different forms of the scales and chords. At the left are general directions for using the board. On the right are examples of chords, &c.

The center column, G, represents the scale by semi-tones. The capital letters make up the diatonic major scale and the smaller letters indicate the intermediate semi-tones. The sliding bars B B have lines corresponding with the center column and are for the purpose of obtaining and representing relative pitch. They slide in ways or gutters in the board. (Shown by cross-section in Fig. 4.)

Having described our invention, we will set forth some of its merits. The movement of the scales on the sliding bars B B demonstrates the idea or theory of transposition in music to the most ordinary mind at once, and also the use of the flats and sharps, while at the same time there is no confusion, because the scales are still represented in the usual form of writing them, and the mind may follow with little effort the scales through all the changes and see why the scale is transposed. This is accomplished by setting the sliding scale at the key of C; then, by moving to any other degree and referring to the middle column, read the flats or sharps. By changing the notes, get any of the forms of the scale or chords.

In the ordinary mode of representing musical scales the theory or science of transposition is left to be explained by language or words with much labor, and the ideas of the pupil get confused, necessarily, by the labor of following the teacher in his explanations, consequently very few ever get the true idea; but in this method it is made patent to the eye at once by the mere movement of the slides and notes.

In the study of thorough-bass the construction of the chords, once learned, in any key, can be transposed at will to any other key. and all the keys and the flats and sharps will be designated. This renders the study of music a desirable amusement as well as a profitable one, instead of being incomprehensible and irksome. No other method accomplishes the mechanical analysis and transposition of the scales so completely as this and at the same time so readily understood by the pupil. The b'nding of it into a book renders it cheap and easy of carriage, and always at hand, and makes a new article of manufacture.

What we claim, and desire to secure by Letters Patent, is—

1. The sliding bars and scales B B, with their attachments $c\ c$ and $d\ d$, in combination with the enharmonic scale diagram G.

2. The movable note-pins E, for the purpose set forth.

3. The combination of the said device with a book and bound into it, as shown and described.

4. The combination of all the devices, for the purpose set forth.

WM. H. BOWLSBY.
GEORGE W. BOWLSBY.

Witnesses:
GEO. CUSTER,
G. PETERE.